US006865813B2

(12) United States Patent
Pollak

(10) Patent No.: US 6,865,813 B2
(45) Date of Patent: Mar. 15, 2005

(54) TOOL HAVING A HOLDER FOR MOUNTING ON A DRIVE SHAFT

(75) Inventor: Roland Pollak, Runkel (DE)

(73) Assignee: C. & E. Fein GmbH & Co. KG (DE)

( * ) Notice: Subject to any disclaimer, the term of this patent is extended or adjusted under 35 U.S.C. 154(b) by 309 days.

(21) Appl. No.: 09/988,956

(22) Filed: Nov. 21, 2001

(65) Prior Publication Data

US 2002/0069727 A1 Jun. 13, 2002

(30) Foreign Application Priority Data

Nov. 23, 2000 (DE) ........................................ 100 58 894

(51) Int. Cl.[7] ........................ B27B 19/09; B27B 19/00; B23B 49/10

(52) U.S. Cl. .................... 30/166.3; 30/272.1; 30/277.4; 30/329; 30/337; 30/339; 30/392

(58) Field of Search ............................ 30/277.4, 272.1, 30/339, 392, 329, 337, 166.3; 83/597

(56) References Cited

U.S. PATENT DOCUMENTS

| | | | | | |
|---|---|---|---|---|---|
| 3,740,847 | A | * | 6/1973 | Kliever et al. | 30/277.4 |
| 3,905,374 | A | * | 9/1975 | Winter | 30/166.3 |
| 3,952,412 | A | * | 4/1976 | Rhodes | 30/166.3 |
| 4,106,181 | A | * | 8/1978 | Mattchen | 30/339 |
| 4,252,121 | A | * | 2/1981 | Arnegger | 606/53 |
| 4,286,383 | A | * | 9/1981 | Farden | 30/169 |
| 4,294,013 | A | | 10/1981 | Krieg | 30/392 |
| 4,333,231 | A | * | 6/1982 | Yeargin | 7/165 |
| 4,386,609 | A | * | 6/1983 | Mongeon | 30/339 |
| 4,490,885 | A | * | 1/1985 | Iskiw et al. | 30/277.4 |
| 4,513,742 | A | * | 4/1985 | Arnegger | 30/350 |
| 4,821,357 | A | * | 4/1989 | Millette | 30/277.4 |
| 4,852,261 | A | * | 8/1989 | Wittek | 30/277.4 |
| 4,980,976 | A | * | 1/1991 | Junginger et al. | 30/272.1 |
| 5,038,478 | A | * | 8/1991 | Mezger et al. | 30/272.1 |
| 5,231,910 | A | * | 8/1993 | Harsch et al. | 30/272.1 |
| 5,263,972 | A | * | 11/1993 | Evans et al. | 30/339 |
| 5,309,805 | A | * | 5/1994 | Mezger et al. | 30/272.1 |
| D360,946 | S | * | 8/1995 | Goris | D24/146 |
| 5,468,247 | A | * | 11/1995 | Matthai et al. | 30/339 |
| 5,480,507 | A | | 1/1996 | Arnold | 156/344 |
| 5,507,763 | A | * | 4/1996 | Petersen et al. | 30/166.3 |
| 5,554,165 | A | * | 9/1996 | Raitt et al. | 30/340 |
| 5,697,158 | A | * | 12/1997 | Klinzing et al. | 30/166.3 |
| 5,846,244 | A | * | 12/1998 | Cripe | 30/166.3 |
| 6,401,342 | B1 | * | 6/2002 | Kloss et al. | 30/272.1 |
| 6,422,110 | B1 | * | 7/2002 | Wurst et al. | 30/277.4 |
| 6,434,835 | B1 | * | 8/2002 | Grunikiewicz et al. | 30/272.1 |
| 6,647,629 | B2 | * | 11/2003 | Farland | 30/329 |

FOREIGN PATENT DOCUMENTS

| | | |
|---|---|---|
| DE | 195 47 332 A1 | 6/1997 |
| DE | 299 16 113 U1 | 9/1999 |
| EP | 0 141 035 | 7/1984 |
| EP | 0 339 357 B1 | 4/1989 |

* cited by examiner

*Primary Examiner*—Allan N. Shoap
*Assistant Examiner*—Jason Prone
(74) *Attorney, Agent, or Firm*—St. Onge Steward Johnston & Reens LLC

(57) ABSTRACT

A tool is disclosed having a holder provided with a mounting opening for mounting on a drive shaft, which may be driven in oscillating fashion, and having further a fixture for mounting a working element. The working element comprises at least two holding sections, spaced one from the other in tangential direction to the mounting opening, and wherein a mounting plate is provided which is engaged by releasable securing elements that coact with the holding sections for clamping the working element against the holder.

5 Claims, 2 Drawing Sheets

VI
VI
32
34
38
42
44
46
48
49
50
51
52
53
54
55
56
58
60
62
64

TOOL HAVING A HOLDER FOR MOUNTING ON A DRIVE SHAFT

BACKGROUND OF THE INVENTION

The present invention relates to a tool having a holder provided with a mounting opening for mounting it on a drive shaft, which preferably can be driven in oscillating fashion, and having further a fixture for mounting a working element.

The invention further relates to a holder and a working element for such a tool.

A tool of this kind has been known from EP 0 339 357 B1 which discloses a cutting knife, especially for separating joint seals or insulating elements employed on glass panes, with a holder for mounting it detachably on the drive shaft that can be driven in oscillating fashion. To this end, the holder comprises a mounting opening that can be positively connected to a correspondingly shaped connecting piece of the drive shaft. The cutting or working element can be connected to the holder either directly or via an adapter element. By using such a split structure of the tool, it is intended to permit the tool to be produced at lower cost.

However, the different known variants are connected with the disadvantage that they are not always up to the high stresses, which in part vary heavily, and that some of them are excessively resilient. And their structure is relatively complicated as well.

SUMMARY OF THE INVENTION

It is a first object of the present invention to provide a tool that can easily be produced at low cost in different sizes and shapes that can easily be attached to a drive shaft of a power tool.

It is a second object of the invention to provide a tool having a good stability in operation.

It is a third object of the invention to provide a tool suitable for easy attachment to a power drive oscillatingly driven back and forth about a drive shaft thereof at high frequency.

These and other objects of the invention are achieved by a tool comprising a working element having at least two holding sections spaced apart, and further comprising a holder which is engaged by releasable securing elements, that coact with holding sections arranged on the holder for clamping the working element against the holder.

The object of the invention is thus perfectly achieved.

By providing at least two holding sections, preferably spaced in tangential direction, and providing for additional clamping of the working element by means of securing elements coacting with the holding sections, the invention achieves high stability during operation. At the same time, such a tool can be produced at low cost and can be exchanged easily.

According to a convenient development of the invention, the securing elements take the form of screws that can be screwed into threaded sections of the holder.

This allows the working element to be mounted on the holder easily and quickly.

The two screws eliminate the need for a positive connection arrangement, whereby it is rendered possible for the working element to project laterally.

According to an additional further development of the invention, the holding sections take the form of holes through which the securing elements or the screws, respectively, can be clamped against the holder.

In a further development of that embodiment, the holding sections are designed as oblong holes which extend in a direction toward the mounting opening and which are open to the outside on the side of the working element that faces the mounting opening.

This feature allows the working element to be exchanged on the holder easily and quickly. It is only necessary for this purpose to untighten the securing elements or the screws, respectively, whereafter the working element can be withdrawn from the holder through its oblong holes, and another working element can be fitted, which is then clamped again by tightening the securing elements or the screws, respectively.

According to an advantageous further development of the invention, the holder comprises a main body, made of a plastic material, which is reinforced by a metal core extending at least in the area of the securing elements and/or the mounting opening.

This feature provides the possibility to make the holder as light in weight as possible and, at the same time, sufficiently stable in dimension and distortion-resistant. Low weight is a considerable advantage for the holder because of the reduced inertia of the tool that must be moved by the drive, which is of particular importance with oscillating drives. A special advantage of this embodiment lies in the fact that the tool is separated electrically from the driving machine, whereby safety from accidents is improved.

In the case of this embodiment, the holder can be produced, with advantage and in an especially low cost manner, as an injection-molded plastic part.

The core may be designed, for example, as a substantially plane plate reinforced by one or more projecting crimped portions, whereby its stability is greatly improved.

According to an additional further development of the invention, a strain washer that can be clamped on the drive shaft by means of a clamping screw is associated to the mounting opening.

This feature allows easy and quick mounting of the tool on the drive shaft.

It is understood that the features recited above and those yet to be explained below can be used not only in the respective combination indicated, but also in other combinations or in isolation, without leaving the context of the present invention.

Further features and advantages of the invention will be apparent from the description of preferred embodiments given below with reference to the drawings.

DETAILED DESCRIPTION OF THE PREFERRED EMBODIMENT

Figures 1, 2, 3:
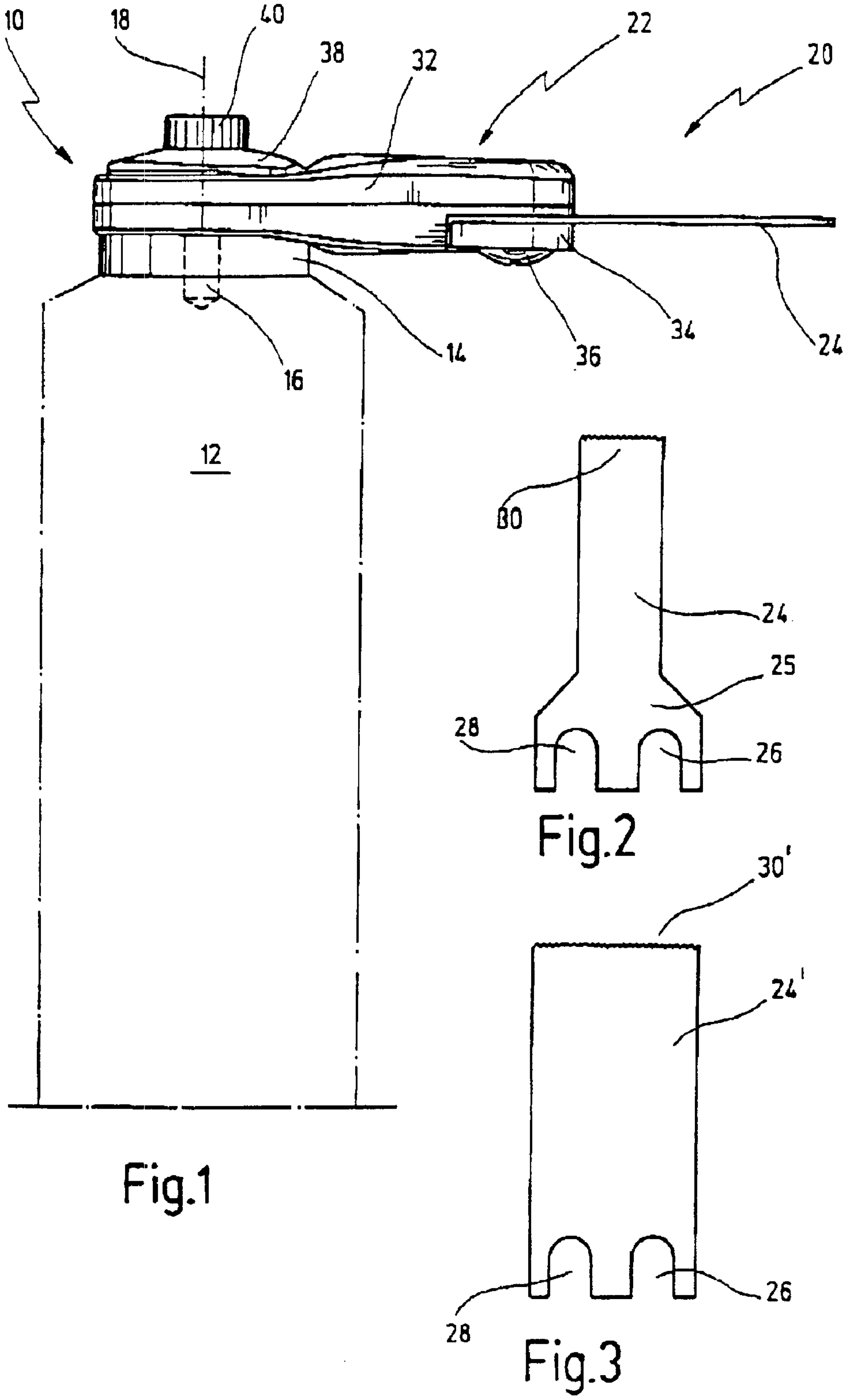
FIG. 1 shows a side view of a tool according to the invention, mounted on a machine tool shown in diagrammatic representation only.
FIG. 2 shows a top view of the working element of the tool according to FIG. 1.
FIG. 3 shows a top view of a working element slightly modified as compared with the embodiment of FIG. 2.

In FIG. 1, a power tool, shown in purely diagrammatic representation, is indicated by reference numeral 10.

The power tool 10 comprises, for example, an oscillating drive 12 which sets a drive shaft 14 in reciprocating oscillating movement about its longitudinal axis 18, at a small pivotal angle of, for example, 0.5–5 degrees and at a high frequency of, for example, about 5000 to 30000 oscillations per minute.

Oscillating drives of that kind are known and are employed in connection with a correspondingly shaped cutting knife, for example for cutting through an adhesive bead on a windscreen in cases where the windscreen must be exchanged because of a defect, for example. In addition, such tools which are driven in oscillating fashion, have been found to be of advantage for numerous other tasks for which the most diverse sawing tools of oblong, circular or partially circular shape, grinding tools of special shapes or cutting tools in the form of specially designed cutting knives are known.

FIG. 1 shows such a tool, indicated generally by reference numeral 20, mounted on the drive shaft 14 by means of a straining washer 38 and a clamping screw 40 passed through the latter and screwed into a thread 16 of the drive shaft 14.

The tool 20 comprises a holder 22 and, connected with it, a working element 24 designed as an elongated saw blade with a toothed straight cutting edge 30 formed on its end face opposite the drive shaft 14.

Such a working element 24 is particularly well-suited for producing cuts in places which are accessible only with difficulty.

The holder 22 comprises a basic element 32, which is mounted by one of its ends on the drive shaft 14 by means of the straining washer 38 and the clamping screw 40 and whose other end, facing away from the drive shaft 14, serves to receive the working element 24 that can be mounted thereon by means of the mounting plate 34 and securing elements 36 in the form of screws.

Figures 4, 5, 6, 7, 8:
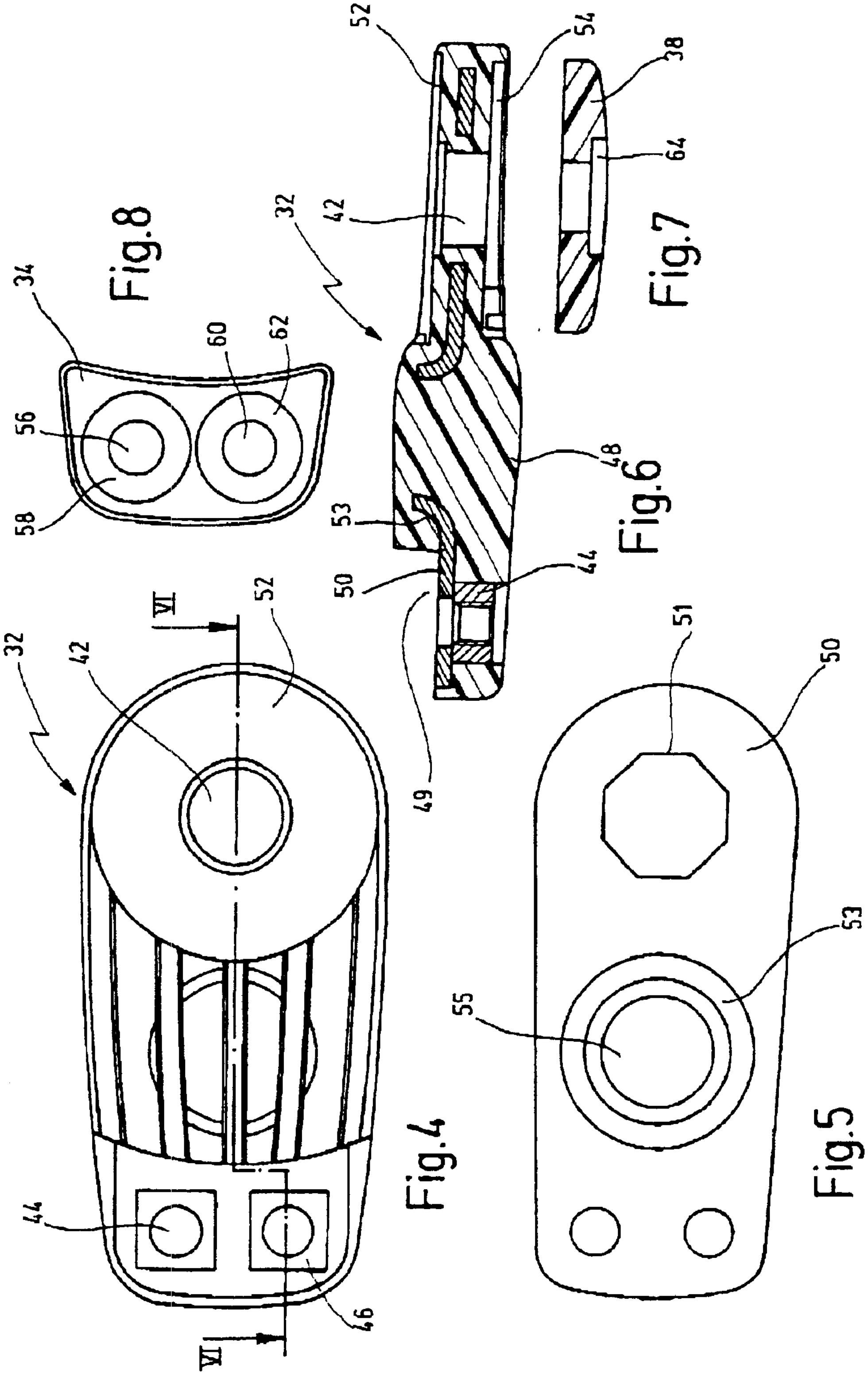
FIG. 4 shows a top view of a basic element of the holder for the tool according to FIG. 1.
FIG. 5 shows a top view of a metallic core received in the basic element according to FIG. 4.
FIG. 6 shows a sectional view of the basic element according to FIG. 4, taken along line VI—VI.
FIG. 7 shows a sectional view of a strain washer that can be mounted on the holder for fastening the latter on the drive shaft of the machine tool by means of a clamping screw.
FIG. 8 shows a top view of a mounting plate for mounting the working element on the basic element.

The structure of the basic element 32 is illustrated more fully in FIGS. 4 to 6.

As can be seen in FIG. 4, the basic element 32 exhibits an elongated basic shape, with a first end substantially in the form of a circular arc, in which a mounting opening 42 is provided for mounting it on the drive shaft 14. The basic element 32 further comprises two lateral edges, which are slightly bent in outward direction and which meet again on the other end, opposite the drive shaft 14, via two rounded corner portions. A recess 49 is arranged in the arc of that second end, as can be seen in FIG. 6. Two threaded inserts 44, 46, the threads of which extend approximately parallel to the lengthwise axis 18 of the drive shaft 14, are arranged in that area in the corner portions of the basic element 32 in tangentially spaced arrangement relative to the mounting opening 42.

Associated to the two threaded inserts 44, 46 are two correspondingly positioned oblong holes 26, 28 provided in a mounting section 25 of the working element 24, as can be seen in FIG. 2. It is thus possible to fit the mounting section 25 of the working element 24 on the recess 49 of the basic element (shown in enlarged scale in FIGS. 4 to 6) so that once a correspondingly shaped mounting plate 34, as shown in FIG. 8, has been applied two clamping elements 36 in the form of screws can be screwed into the threaded inserts 44, 46 through the holes 56, 60 of the mounting plate and through the oblong holes 26, 28 of the working element 24 in order to firmly clamp the working element 24 on the basic element 32 of the holder 22.

As two holding sections 26, 28 of the working element 24 are shaped as oblong holes, being open on the end face of the mounting section 25 opposite the drive shaft 14, the two screws or securing elements 36 by means of which the working element 24 is clamped on the basic element 32 via the mounting plate 34, merely has to be untightened when the working element 24 has to be exchanged so that the working element 24 then simply can be pulled out. Thereafter, another working element with correspondingly shaped holding sections or oblong holes 26, 28, respectively, can be slid into the space between the mounting plate 34 and the surface of the recess 49 until the two oblong holes or holding sections 26, 28 abut against the securing elements 36 or the screws. Finally, the securing elements 36 or the screws are tightened to fasten the new working element 24.

This ensures quick exchanges and stable and stiff mounting of the working element on the holder 22. Further, differently shaped working elements can be mounted on the holder 22, provided they are equipped with a suitable mounting section 25 with two correspondingly shaped holding sections 26, 28 provided thereon.

FIG. 3 shows, by way of example only, another working element 24', likewise in the form of an elongated saw blade having a rectangular basic shape and similarly carrying on its outer end a toothed cutting edge 30'. Its end facing the holder 22 is again provided with two correspondingly shaped holding sections 26, 28 in the form of oblong holes. This working element differs from the working element 24 of FIG. 2 only by the larger width of its cutting edge 30' so that the working element 24' exhibits a generally rectangular contour.

It is understood that in addition to working elements of the described shapes, working elements of any other shape and type may likewise be mounted on the holder 22 provided they are equipped with a suitable mounting section and two correspondingly shaped holding sections. For example, the working elements might be designed as cutting knives provided with a sickle-shaped bent portion, or with straight cutting edges that converge toward the middle in wedge-like fashion. Other shapes are also imaginable, as desired. Instead of the toothed edge, the use of abrasive grains or cutting edges with hard-metal or diamond tips is likewise imaginable.

As is shown more fully in FIG. 6, the basic element 32 comprises a plastic main body 48 which is reinforced by a core 50 made of metal, preferably of steel. The core 50 takes the form of a plate which extends over substantially the entire surface of the basic element 32 and which is provided, on its one end, with a punched hole 51 in the area of the mounting opening 42 and, on its other end, with the two threaded inserts 44, 46 (not shown in FIG. 5) that may be fixed thereon by riveting, welding or may be integrally formed with the element. The core 50 is provided at its center with a crimped portion 53 which projects toward the top and in which a central hole 55 is formed.

This shape serves to improve the torsional rigidity while simultaneously saving weight. The core 50 can simply be produced as a punched part in which the crimped portion 53 is produced in a suitable press and to which the threaded inserts 44, 46 are attached subsequently by welding. The basic element 32 can be produced by injection molding after the core 50 has been placed in a suitable mold. The crimped portion 53 plays an important role in improving the torsional rigidity.

On its end facing the drive shaft 14, the basic element 32 is provided, on the side of the drive shaft 14, with a slightly recessed mounting surface 52 intended to be brought into contact with the drive shaft 14 and, on the opposite side, with a recess 54 intended to receive the straining washer 38. The straining washer 38 is provided with a suitable recess 64 for receiving the clamping screw 40, which may be a knurled screw provided on its circumferential surface with a suitable knurling, or, for example, a socket-head cap screw.

It is understood that where a positive connection between the holder 22 and the drive shaft 14 is desired or advantageous, it is also imaginable, for example, to provide the drive shaft with a polygonal portion and to give the punched portion 51 of the core 50 a matching shape so that a positive connection on between the punched portion 51 and the drive shaft 14 can be achieved when the punched portion 51 extends up to the inner surface of the mounting opening 42.

The shape of the mounting plate 34, illustrated more fully in FIG. 8, is matched to the shape of the recess 49 of the basic element 32. The holes 56, 60 intended for passing the clamping elements 36 or the screws are provided with countersunk areas 58, 62 which permit the screws to be centered.

What is claimed is:

1. A tool comprising:

a working element having a working section at one end thereof and having at least two flat holding sections at another end thereof, said holding sections being configured as oblong holes arranged spaced apart from each other extending toward said other end and opening thereto;

a holder comprising a main body and a mounting plate releasably attached to said main body, said holder having a mounting opening at one end thereof for attaching said holder to a drive shaft of a power tool, and having a receiving section at another end thereof for receiving said working element;

a plurality of securing elements engaging said main body and said mounting plate releasably and extending through said holding sections for clamping said working element between said main body and said mounting plate; wherein said holder is made of a plastic material, which is reinforced by a metal core extending therein; and wherein the core is designed as a substantially plane plate reinforced by at least one projecting crimped portion.

2. The tool as defined in claim 1, wherein the holder is configured as an injection-molded plastic part.

3. A tool comprising:

a working element having at least two holding sections arranged spaced apart;

a holder having a mounting opening at a first end thereof for attaching said holder to a drive shaft of a power tool, and having a receiving section at a second end thereof for receiving said working element; and a plurality of securing elements engaging said holding sections releasably for clamping said working element to said holder;

wherein the holder further comprises a main body, made of a plastic material, which is reinforced by a metal core extending therein; and wherein the core is designed as a substantially plane plate reinforced by at least one projecting crimped portion.

4. The tool as defined in claim 3, wherein the holder is configured as an injection-molded plastic part.

5. The tool as defined in claim 3, further comprising a strain washer and a clamping screw extending through said mounting opening for engaging the drive shaft to clamp said holder with said strain washer against said drive shaft.

* * * * *